United States Patent
Besold

(10) Patent No.: US 7,682,550 B2
(45) Date of Patent: Mar. 23, 2010

(54) METHOD OF COMPRESSION MOLDING THERMOPLASTIC MATERIAL

(75) Inventor: Udo Besold, Rednitzhembach (DE)

(73) Assignee: Sumitomo (SHI) Demag Plastics Machinery GmbH, Schwaig (DE)

(*) Notice: Subject to any disclaimer, the term of this patent is extended or adjusted under 35 U.S.C. 154(b) by 273 days.

(21) Appl. No.: 11/735,681

(22) Filed: Apr. 16, 2007

(65) Prior Publication Data

US 2007/0187872 A1    Aug. 16, 2007

Related U.S. Application Data

(63) Continuation of application No. PCT/EP2005/054358, filed on Sep. 5, 2005.

(30) Foreign Application Priority Data

Oct. 20, 2004    (DE) .................. 10 2004 051 324

(51) Int. Cl.
*B29C 45/56* (2006.01)
*B29C 45/64* (2006.01)

(52) U.S. Cl. ............................. 264/328.7; 425/595

(58) Field of Classification Search .......... 264/328.7; 425/595
See application file for complete search history.

(56) References Cited

U.S. PATENT DOCUMENTS 4,855,095 A    8/1989    Sato

FOREIGN PATENT DOCUMENTS

| EP | 0 244 783 | 11/1987 |
|----|-----------|---------|
| EP | 0 477 967 | 4/1992 |
| EP | 0 868 988 | 10/1998 |
| JP | 02 009614 A | 1/1990 |
| JP | 06 304984 A | 11/1994 |
| JP | 06 344408 A | 12/1994 |
| JP | 08-174615 | * 12/1994 |
| JP | 08 323832 A | 12/1996 |
| JP | 09 024534 A | 1/1997 |

OTHER PUBLICATIONS

Translation of Japan 08-174615.*

* cited by examiner

*Primary Examiner*—Jill L Heitbrink
(74) *Attorney, Agent, or Firm*—Henry M. Feiereisen; Ursula B. Day

(57) ABSTRACT

In a method of compression molding thermoplastic material, a compression gap is set between half-molds of a mold having fixed and movable platens for respective attachment of the half-molds. After setting the compression gap, the mold is closed and the platens are locked by moving locking elements into respective receiving elements. Injection of plasticized material then commences into a cavity formed between the half-molds when the mold is closed. The mold then opens as a result of pressure generated by the injected plasticized material until a distance between the half-molds corresponds to the compression gap. Subsequently, the mold undergoes a closing movement through application of a clamping force, thereby compressing the plasticized material.

14 Claims, 3 Drawing Sheets

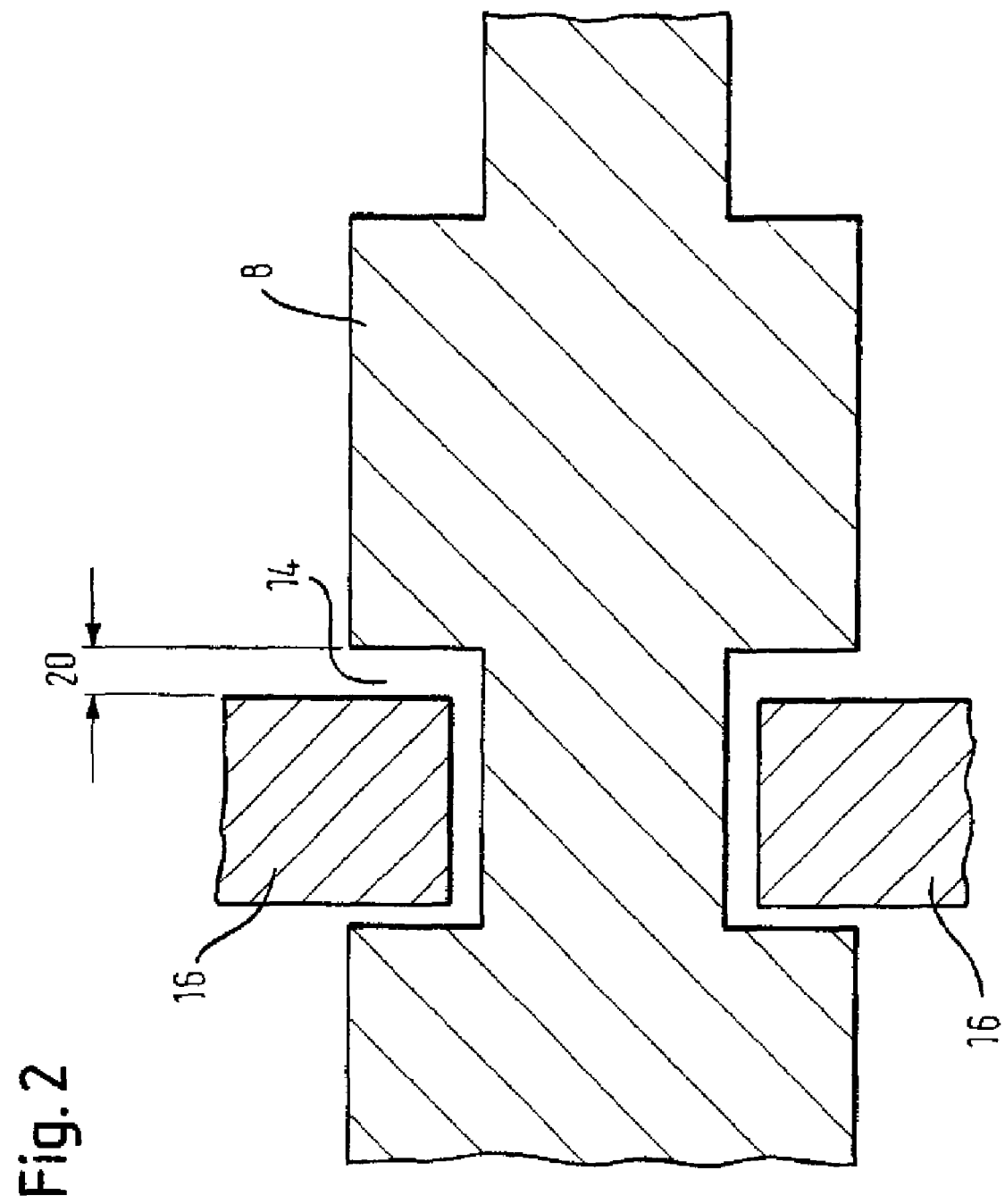

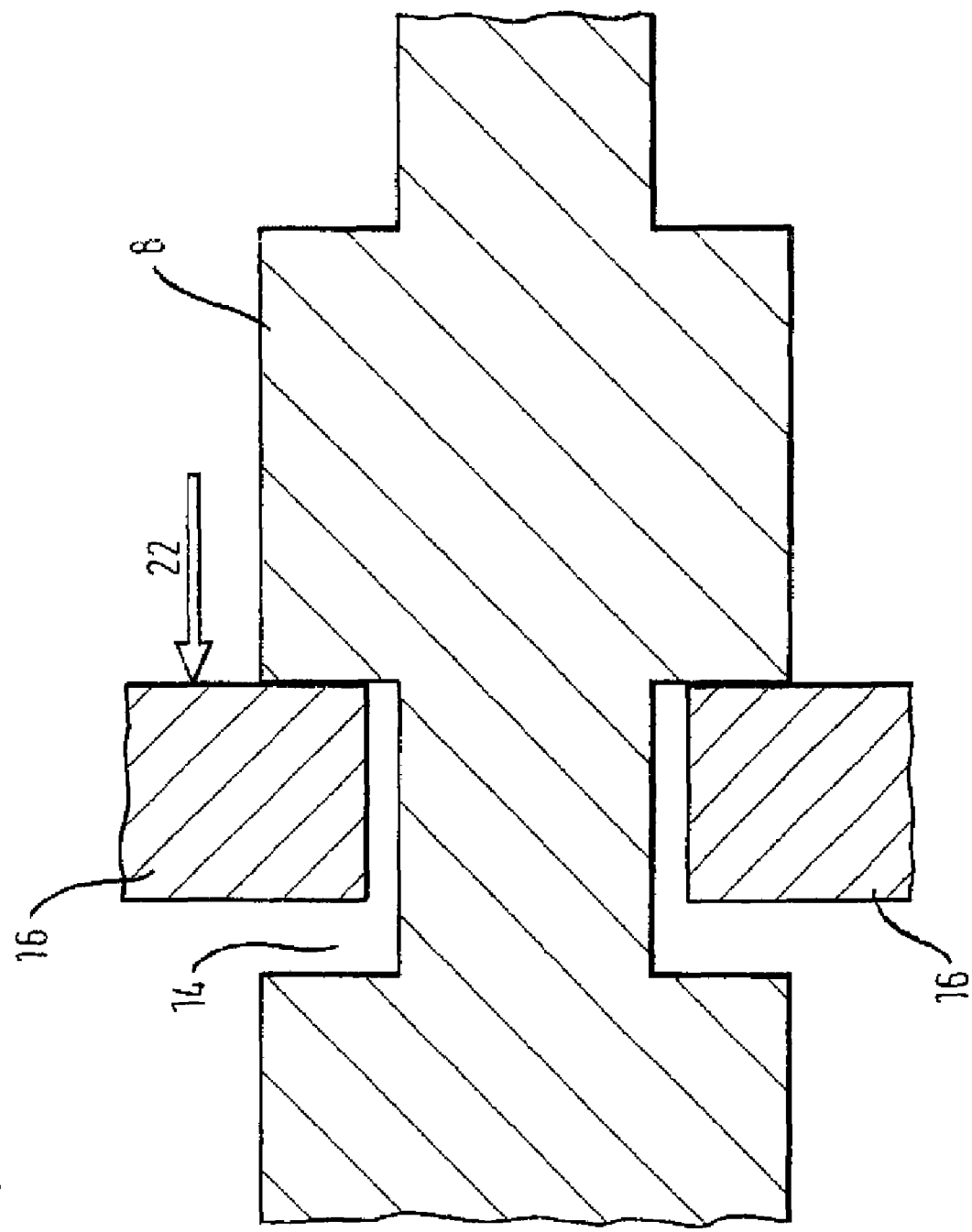

METHOD OF COMPRESSION MOLDING THERMOPLASTIC MATERIAL

CROSS-REFERENCES TO RELATED APPLICATIONS

This application is a continuation of prior filed PCT International application no. PCT/EP2005/054358, filed Sep. 5, 2005, which designated the United States and has been published but not in English as International Publication No. WO 2006/042772 A1 and on which priority is claimed under 35 U.S.C. §120, and which claims the priority of German Patent Application, Serial No. 10 2004 051 324.4, filed Oct. 20, 2004, pursuant to 35 U.S.C. 119(a)-(d), the contents of which are incorporated herein by reference in its entirety as if fully set forth herein.

BACKGROUND OF THE INVENTION

The present invention relates to a method of compression molding thermoplastic material.

Nothing in the following discussion of the state of the art is to be construed as an admission of prior art.

There are various proposals of compression molding thermoplastics. For example, published European Pat. Appl. No. 0 244 783 describes a method for molding articles by injecting melt into a pre-enlarged cavity that is formed between half-molds on respective platens. Compression of the injected melt begins before the injection process is over. Once the compression step has been completed and the cavity has been reduced to its final size, the melt is maintained under pressure until it solidifies.

Another approach is disclosed in published European Pat. Appl. No. 0 477 967 A2, which involves a closing of the half-molds until the mold cavity has a size less than the final cavity size. Melt is then injected into the cavity, accompanied by an opening of the mold so that the cavity size becomes larger than the final cavity. The mold then closes before or when the melt supply is completed.

Published European Pat. Appl. No. 0 868 988 A1 describes an injection molding machine with a vertical clamping unit to fully close a mold. Subsequently, the upper platen is set to a substantially pressure-free state and molten thermoplastic material is injected, so that the movable platen is pushed away by the melt pressure. After conclusion of the injection step, the gate is sealed and the compression step commences. Injection of melt into a horizontal clamping unit requires application of a counterpressure to prevent uneven melt distribution.

However, for a number of reasons, the various proposals are endowed with drawbacks and shortcomings relating for example to manufacturing techniques or to the effect that is hoped to be obtained but may not always be realized. For example, one drawback common to all prior art proposals is the requirement to precisely define the position of the half-molds before injection starts. In other words, the position of the platens must be precisely controlled. In particular when hydraulic injection molding machines are involved, this precise movement of the platens is very slow and time-consuming. Such a defined position cannot be realized when injecting melt and opening the movable platen through melt pressure. The compression step commences as soon as the entire amount of melt has been introduced and the gate has been sealed. Injection during compression becomes thus impossible. In particular, when a horizontal injection molding machine is involved, the absence of a predefined compression position causes uneven melt distribution.

It would therefore be desirable and advantageous to provide an improved method of compression molding thermoplastic material, to obviate prior art shortcomings and to produce high-quality products in a simple and yet at short cycle time, whereby a compression position is easy and quickly to realize.

SUMMARY OF THE INVENTION

According to one aspect of the present invention, a method of compression molding thermoplastic material includes the steps of a) setting a compression gap between half-molds forming part of a mold having fixed and movable platens for respective attachment of the half-molds, b) closing the mold, c) locking the platens by moving locking elements into respective receiving elements, d) starting injection of plasticized material into a cavity formed between the half-molds when the mold is closed, e) opening the mold as a result of pressure buildup during injection of the plasticized material until a distance between the half-molds corresponds to the compression gap, and f) closing the mold through application of a clamping force, thereby compressing the plasticized material.

In the following description, the term "compression gap" is to be understood as a distance established between the half-molds at the start of the compression step.

According to another feature of the present invention, the half-molds are attached to the platens in such a manner that opening and closing of the mold corresponds to a movement of the platens towards or away from one another. The movable platen can be held in place after the platens have been moved together and can be released after injection of melt has commenced or can be set in a substantially force-free state directly after the platens have been moved together.

In step f), the mold is closed by a clamping force and the half-molds are moved together under pressure until the final size of the cavity has been reached. Thereafter, an additional clamping force can be applied until the melt in the cavity has cured to such an extent that the thus-produced molded product can be demolded.

A method according to the present invention is especially suitable for application with injection molding machines having tie rods to connect the platens for absorbing the clamping force and including locking elements that are engageable in respective receiving elements for locking the platens in relation to respective force-absorbing elements, before the clamping force is applied. When locked, the platens are positioned in relation to the tie rods in such a manner that the applied clamping force upon the mold, which is carried by the platens, is transmitted via the tie rods. Examples of such injection molding machines include 3-platen injection molding machines having a support platen in addition to the moving and fixed platens, with the three platens being connected by tie rods and locking elements being provided to establish a clamping position of the mold whereby the clamping force between movable and fixed platens can then be applied via suitable mechanisms, e.g. pressure pads. It may hereby be conceivable, to provide the movable platen with a plunger extension which can move inside a cylinder and be locked in place in relation to the cylinder by engaging locking elements, e.g. pressure-loaded bolts, in receiving elements, e.g. annular grooves. The plunger is movably supported in a pressure cylinder mounted on the support platen and is acted upon by pressure. After moving the fixed and movable platens together along the tie rods through operation of separate displacement cylinders, the movable platen is locked in relation to the plunger and the clamping force is applied between fixed and movable platens through buildup of pressure in the pressure cylinder and is transmitted across the tie rods.

In other examples of such injection molding machines, the locking elements may be provided on the support platen or fixed platen while the receiving elements may be provided on the tie rods. This is especially of advantage when the tie rods can move out of the mold area by means of tie rod pulling mechanisms. The buildup of a clamping force may be implemented by pressure pads. As an alternative, it may also be conceivable to provide, especially on the side of the fixed platen, a sandwich construction, with pressure being applied between the fixed platen and the associated sandwich platen which carries the mold.

Locking elements for interaction with respective receiving elements can be used in particular in a 2-platen injection molding machine, with the receiving elements again provided on the tie rods while the locking elements can be supported by the fixed platen or movable platen. Generation of a clamping force may be realized by pressure pads which act on the (four) tie rods or also on the locking elements relative to a platen. The 2-platen injection molding machine may also include a sandwich plate so that the clamping force can be applied by pressure plungers between the respective platen and associated sandwich plate or pressure plate.

In accordance with the present invention, locking takes place as soon as the mold has been closed, and plasticized material is then injected from the plasticizing unit through respective gates into the mold cavity. The movable platen is moved, in opposition to the force of inertia and possible friction forces, as a result of pressure generated by injected melt so that the mold starts to open. This passive opening, not actively executed by using respective mechanisms, such as displacement cylinders, to control of the movable platen, further simplifies the overall method because the opening operation is carried essentially spontaneous or automatic as thermoplastic material to be compressed is injected. As soon as the mold has opened to an extent at which the distance between the half-molds corresponds to the set compression gap, suitably indicated when a mechanical boundary has been reached, the mold starts to close through application of the clamping force to execute the compression step of the injected melt in the cavity. When the movable platen has been moved against the fixed platen to establish the final size of the cavity, compression stops and the mold is held closed until the thermoplastic material has sufficiently cooled down to allow its removal from the mold.

An advantage of the method according to the invention is the setting of the compression gap before the platens assume their starting position immediately prior to injection of newly plasticized material. In other words, the step of setting the compression gap may be carried out before the mold closes for executing a new compression molding step. As the compression gap is now set at an earlier stage compared to the prior art, the subsequent processing steps can be executed more rapidly. Thus, there is no need for a precise positioning of the platens and no need for a precise relative positioning of the half-molds, when the mold closes. In other words, there is no need to move the platens to a position in which the presence of a precisely pre-enlarged or pre-diminished cavity has to be ensured. Rather, the closing step can be carried out in a time-saving manner. The substantially passive opening of the mold as a result of pressure generated by the injected melt enables the implementation of a compression molding method that is easy to control. The mold can easily be closed and the platens can be easily moved together, for example, through provision of a hydraulically controllable displacement cylinder that requires little force application.

According to another feature of the present invention, the step of setting the compression gap may include the step of moving the receiving elements in relation to the locking elements before the locking elements are locked. Either the receiving elements or those components that carry the receiving elements can be moved relative to the locking elements, or vice versa. The relative movement may normally take place along a direction defined by the clamping force, for example in parallel relationship to the tie rods. The compression gap is hereby set in such a manner that a distance can be maintained in correspondence to the compression gap between corresponding force-absorbing surfaces during locking operation, i.e. during application of a clamping force between movable and fixed platens. The precise distance correlation depends on the configuration of the locking elements or receiving elements. They may be designed for example in the form of simple "calibers", i.e. clamps which can engage recesses, for example grooves, or in the form of sawtooth jaws which have teeth that move into more than one groove and in which the distances between individual force-absorbing surfaces of the serrations increase or decrease to account for a tie rod extension during application of the clamping force. Care should be taken in this construction to maintain a distance between force-absorbing surfaces in correspondence to the compression gap. In other words, a distance in correspondence to the compression gap must be maintained between the first contacting force-absorbing surface of a locking element and a corresponding force-absorbing surface of the receiving element. Setting of the compression gap may thus be established before the mold closes through use of suitable positioning elements. Mostly small masses are hereby moved and positioned so that the overall construction is characterized by low inertia and can be rapidly controlled. A movement to the compression gap position may, for example, be realized while the locking elements and receiving element have not been locked as of yet.

According to another feature of the present invention, the movement toward the compression gap position may be executed while the tie rods are relieved. Relief of the tie rods has to be provided, when the clamping force is transmitted via tie rods and corresponding locking and receiving elements. After applying the clamping force, the respective force-absorbing surfaces of locking and receiving elements are still in contact as a consequence of the clamping force so that a retraction of the locking elements from the receiving elements becomes possible only when exerting a great force and accepting substantial wear of the corresponding surfaces. Therefore, relief of the tie rods is necessary, i.e. a clamping force can no longer be transmitted via the tie rods so that the locking and receiving elements no longer touch or at least are not forced into contact with one another. As a consequence, the locking elements can now easily be disengaged absent any substantial wear from the receiving elements. Heretofore, relief of the tie rods has oftentimes been implemented via an opposing force or pressure introduction by the mechanism that applies the clamping force in a time-controlled manner so that the locking elements have been positioned approximately in midsection of the receiving elements. In accordance with the invention, the locking elements can be constructed in relation to the receiving elements such that a clearance is established therebetween so that a distance in correspondence to the compression gap can be maintained between corresponding clamping-force-absorbing surfaces of the locking and receiving elements substantially in the direction of the clamping force. In other words, when, for example, the receiving elements are constructed as grooves, and the locking elements are constructed as "calibers", a linear extension of the "calibers" should be smaller by at least the dimension of the compression gap than a linear extension of the grooves in the direction of the clamping force.

Such a relief of the tie rods is thus required when operating an injection molding machine with locking and receiving elements before the mold with the cured end product can be opened, regardless whether injection molding or compression molding is involved. Advantageously, the movement into the compression gap position may be carried out at a same time as the tie rods are relieved. Thus, an operation that is applied anyway can be exploited in accordance with the present invention to execute a further required operation which would otherwise have to be carried out separately later. This again optimizes time and simplifies control because of the elimination of a separate step.

By setting the compression gap in such a manner that it can be maintained during locking between the force-absorbing surfaces of the locking and receiving elements, mold opening can be confined mechanically in the locking state by allowing the surfaces of the locking elements to impact the respective surfaces of the receiving elements. Upon impact, the half-molds assume a position in correspondence to the compression gap. Therefore, there is no need for a complicated setting of the distance between the platens because the distance is easily established by way of this simple mechanical blockage. This is especially advantageous in combination with the passive mold opening as a result of pressure exerted by injected melt since little or no control is required.

As soon as the corresponding force-absorbing surfaces of locking and receiving elements contact one another, which can easily be detected by a position switch, application of the clamping force may be initiated to commence with mold closing and to compress introduced melt. It is, however, also conceivable to provide a delay between reaching the compression gap and start of mold closing, optionally with continued injection of melt.

According to another feature of the present invention, the clamping force may be applied by hydraulic pressure pads which can be accurately controlled. When the tie rods are relieved after compression molding has been completed and before the mold is opened for removal of the finished product, the pressure pads can be controlled such that the compression gap position, i.e. the distance between respective force-absorbing surfaces of the locking and receiving elements, can be approached. As soon as the compression gap position has been reached, e.g. through precise measurement of oil amount used for applying the clamping force per pressure pad, the locking elements assume a position in the receiving elements at a distance to the force-absorbing surfaces of the receiving elements. In this position, the locking elements can be easily withdrawn from the receiving elements. Suitably, the pressure pads are blocked in this compression gap position. Pressure pads may, for example, be configured as double-acting hydraulic cylinders which bar oil supply as well as oil drain to both chambers. Once the pressure pads are blocked in this position, the compression gap has been set between locking and receiving elements, as the mold is still closed, regardless whether the mold is subsequently opened or closed. Thus, the compression gap is set before the mold is opened, and there is no need for a readjustment in a next cycle after closing the mold.

According to another feature of the present invention, the receiving elements may be provided on the tie rods. The receiving elements may hereby be configured in the form of several annular grooves in concentric surrounding relationship to the tie rods at their free, i.e. pullable, ends. Movement of the receiving elements in relation to the locking elements may hereby be realized through movement of the tie rods in relation to a movable or fixed platen that hold the tie rods, or through movement of the locking elements relative to one of the platens. As a result, only fairly small masses need to be moved.

According to another feature of the present invention, the step of setting the compression gap may be realized by distance measuring systems provided on the (four) tie rods. The distance measuring systems may for example ascertain the distance between a tie rod end and a platen carrying the tie rods. The mechanism for applying the clamping force, e.g. hydraulic pressure pads, can then be controlled in response to the distance signal measured at the tie rod to thereby position the tie rods and their grooves.

According to another feature of the present invention, the mold is closed upon striking a stop so that the cavity has a size which substantially corresponds to a final cavity size. In other words, when the half-molds come into contact, the final cavity size is established. In this way, the platens can be positioned especially precise and the mold assumes a desired position, especially with respect to optionally provided cores, slides, or vertical flash faces. In addition, it affords the possibility to preform an optionally inserted decorative material, such as textile or film, as the mold closes. Moreover, it is also ensured that no part is located in the mold. Mold closing with inclusion of a stop can easily and efficiently be implemented and there is no need for a complicated positioning of the movable platen in relation to the fixed platen.

According to another feature of the present invention, the start of injection may be initiated at a same time as a release of the movable platen. After closing, the mold may be held by a displacement cylinder or similar mechanism in the closed state and liberated when injection commences. The movable platen may also be released immediately after mold closing in the event no further forces are applied to open the mold. During opening of the movable platen, injection occurs into the opening cavity. Melt is thus exposed to pressure only by forces of inertia or frictional forces exerted upon the movable platen. As there is no need to inject melt into a pre-enlarged cavity, formation of jetting lines is eliminated that would otherwise cause unwanted surface marks in the finished product when a jet of material impacts a mold surface and the melt freezes there. Executing the injecting step simultaneously with the mold opening step also substantially prevents the formation of marks which are caused by the size of the melt cake which forms when melt is injected into the mold opened by the size of the compression gap and which stops momentarily, causing the melt front to freeze before the mold is closed, i.e. before compression. By injecting into an opening cavity in accordance with the invention, momentary stoppage of the melt cake is prevented or at least significantly reduced so as to avoid surface marks.

According to another feature of the present invention, injection of melt may be continued as the mold closes, i.e. after reaching the mold opening position defined by the compression gap. This further reduces the cycle time. Optionally, compression may last beyond the injection stage and application of the holding pressure. It is, however, also possible to continue the injection and holding pressure application phases after completion of the compression phase. The process profile is also dependent on the material being processed.

According to another feature of the present invention, mold opening, in particular when realized by the injected melt, may be assisted by moving cores which are provided in the area of the mold. The cores may be spring-loaded and thereby assist the passive opening of the mold in particular during the initial phase. Of course, the cores may also be actively controlled.

Currently preferred is however the provision of spring-loaded cores which must be positioned when the mold closes. As an alternative, it is also possible to use, for example, pre-stressed or also controllable vertical flash faces to assist the opening process, at least during the initial phase.

Compression molding is oftentimes used to produce large-area parts, as demanded in the automobile industry for example. These parts are often produced in the presence of cores to clear respective recesses in the flat parts from melt. Assisting the passive mold opening by pre-loaded cores may be beneficial because injected melt is subjected at least initially to a reduced pressure and exposed to less shearing stress.

In particular, when using cores, it may be advantageous to keep the mold closed after the closing step and before the start of the injection step to prevent a premature opening of the mold in the absence of melt introduction.

According to another feature of the present invention, the movable platen may be subjected to a defined counterpressure during passive mold opening, realized by pressure buildup as a result of injected melt and/or by spring-loaded cores or the like elements provided in the cavity or provided for their boundary. The application of a counterforce prevents premature opening of the cavity to the compression gap and ensures a slow successive filling of the volume to be compressed, i.e. of the distending cavity. This further reduces the risk of melt cake formation in the cavity and thus the formation of surface marks. Such a defined counterforce can be implemented through pressurizing a displacement cylinder during opening.

A method according to the present invention is especially applicable for processing long fiber-reinforced thermoplastic material (LFT). Long fiber-reinforced melts in particular are normally exposed to significant shearing stress during injection into the mold, causing damage to the fibers and ultimately shortening of the fibers so that the mechanical properties of a finished product deteriorate. Longer fibers exhibit better mechanical properties, especially strength, when the fibers are thoroughly mixed or sufficiently wetted with the melt. To prevent excessive shearing stress during injection of a long fiber-reinforced melt into a mold, the use of compression molding is beneficial. The passive mold opening according to the present invention as a result of melt pressure causes only minimal stress, especially shearing stress, of the long fiber-reinforced melt, when injected into the cavity. Injection into the opening cavity further effectively prevents the formation of surface marks. When injection of long fiber-reinforced thermoplastic material is involved, injection may be carried out at low speed, at slight application of holding pressure, and at slight back pressure. The mold should have large flow cross sections and few melt deflections. In particular when production of large-area automobile parts is involved for which compression molding is especially applicable, long fiber-reinforced thermoplastic material can advantageously be processed as they ensure an added stability of the finished parts especially in these applications.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 2 is a schematic sectional illustration of locking elements engaging corresponding receiving elements during locking of an injection molding machine; and FIG. 3 is a schematic sectional illustration of the locking and receiving elements, when reaching an open position of the mold, depicting corresponding force-absorbing surfaces of the locking and receiving elements in contact with one another.

DETAILED DESCRIPTION OF PREFERRED EMBODIMENTS

Figure 1:
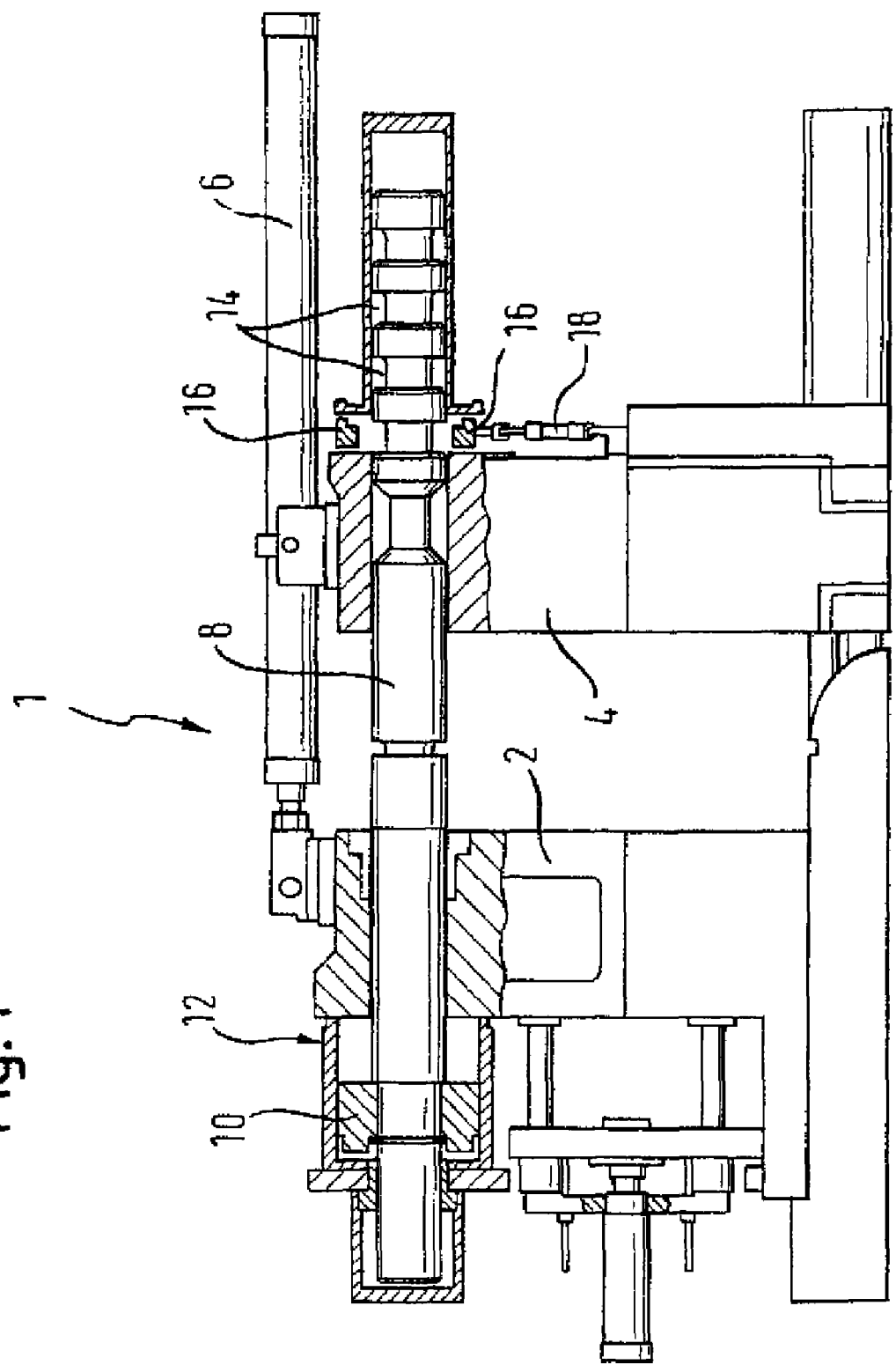
FIG. 1 is a schematic longitudinal section of a clamping unit of a two-platen injection molding machine.

Throughout all the Figures, same or corresponding elements are generally indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a schematic longitudinal section of a clamping unit, generally designated by reference numeral 1 and forming part of a two-platen injection molding machine. The clamping unit 1 includes a movable platen 2 and a fixed platen 4, whereby the movable platen 2 can be moved by a displacement cylinder 6 in relation to the fixed platen 4. The platens 2, 4 carry unillustrated half-molds, respectively, which define a cavity, when the half-molds are closed. Tie rods 8 of the injection molding machine are movably supported in the movable platen 2 and can extend through the fixed platen 4. The tie rods 8 are securely fixed to a plunger 10 of a respective pressure pad 12. The tie rods 8 can be moved relative to the movable platen 2 through appropriate admission of a fluid into a forward or rearward pressure chamber of the pressure pad 12. When the clamping unit 1 is closed, a clamping force can be applied by operating clamping force cylinders of the pressure pads 12.

On their side facing the fixed platen 4, the tie rods 8 are formed with several grooves 14 which can be engaged by calibers 16 supported on the fixed platen 4 and controllable by locking cylinders 18. The clamping unit 1 is preadjusted in dependence on the preselected mold height which is determined by the height of the half-molds between the movable platen 2 and the fixed platen 4, when the mold is closed, i.e. when the half-molds substantially touch one another. The pressure pads 12 are hereby controlled in such a manner that the tie rods 8 move in a position in which the calibers 16, provided on each tie rod 8, are able to move into the nearest groove 14. Provision of several grooves 14 is thus dependent on the use of molds of different heights. A compression gap 20 (FIG. 2) can now be set on the basis of the preadjustment through use of unillustrated distance measuring systems which can measure for example the distance between an end of the tie rods 8 and the movable platen 2, or also an end of the pressure pads 12. In other words, the relative position between the calibers 16 and the associated groove 14 can be set in such a manner that a compression gap 20 can be precisely maintained between a right side of the calibers 16 and the confronting right sidewall of the respective groove 14, when the half-molds assume a closed state. This is shown in FIG. 1. Fine-tuning of the compression gap 20 may be realized through operation of the pressure pads 12 with hydraulic oil. The distance commensurate with the compression gap position and ascertained by the distance measuring systems and the respective adjustment of the pressure pads 12 is stored.

The clamping unit 1 of the injection molding machine operates as follows: Suitable admission of fluid into the pressure compartments of the pressure pads 12 results in a setting of the compression gap 20. Each displacement cylinder 6 is then operated to close the half-molds, supported by the platens 2, 4, respectively, so that the size of the unillustrated cavity corresponds to the final cavity size. The calibers 16 are so positioned in relation to the tie rods 8 that a distance in correspondence to the compression gap 20 is established between the respective force-absorbing surfaces of the calibers 16 and the confronting force-absorbing surfaces of the groove 14, as shown in FIG. 1. Operation of the locking cylinders 18 causes the calibers 16 to engage the groove 14, whereby the compression gap 20 between the force-absorbing surfaces of the calibers 16 and groove 14, respectively, is maintained. This is shown in FIG. 2. The displacement cylinder 6 can now be operated force-free or, optionally, may apply a slight holding force. Thermoplastic melt is then injected by an injection unit via a nozzle opening in the fixed platen 4. As a result, pressure builds up as the thermoplastic malt injected into the cavity to thereby cause a displacement of the movable platen 2 away from the fixed platen 4. In other words, the half-molds move away from one another. The movable platen 2 together with the supported tie rods 8, which are virtually fixed to the platen 2 by the blocked pressure pads 12, can move to left until the force-absorbing surfaces of groove 14 and caliber 16 bear upon one another. This is shown in FIG. 3. The opening movement of the mold and the respective movement of the tie rods 8 are indicated by arrow 22. The mold is now opened by the size of the compression gap 20. As soon as this distance between the half-molds has been reached during opening of the platens 2, 4 and the force-absorbing surfaces of groove 14 and caliber 16 bear upon one another, a mechanical stop is established. The clamping force can now be applied by the pressure pads 12 by generating a clamping pressure through admission of fluid into the cylinder space facing the movable platen 2 in FIG. 1, to thereby close the mold again. As a result, the movable platen 2 moves to the right and thermoplastic material contained in the cavity and optionally additionally injected thermoplastic material is compressed. The compression step is essentially complete, when the half-molds touch each other again, i.e. the cavity has reached its final size. The compression may conceivably be maintained for a longer period until the produced molded part has actually cooled down.

In this state, the force-absorbing surfaces of groove 14 and caliber 16 are in intimate contact by the generated clamping force. To permit a mold opening, the cylinder space of the pressures 12 distal to the movable platen 2 is pressurized. This is realized with the assistance of the distance measuring systems, whereby the tie rods 8 are relieved so that the force-absorbing surfaces detach from one another until the compression gap 20 is again precisely set as a distance between the corresponding surfaces, as shown in FIG. 2. The sidewalls of grooves 14 and calibers 16 are disengaged so that the locking cylinders 18 are actuated and the calibers 16 can be pulled. Operation of the displacement cylinders 6 causes opening of the mold to allow removal of the finished product.

In a next cycle, the displacement cylinders 6 move the half-molds again together and the calibers 16 are moved into the grooves 14, whereby the compression gap 20 already has been established between the calibers 16 and the grooves 14 as a result of the preceding relief of the tie rods 8.

An advantage of a method according to the present invention is the establishment of a compression gap 20 before the compression molding operation begins. Setting of the compression gap 20 results, in particular, in a respective relative positioning of grooves 14 and calibers 16 and can be re-established immediately during the compression molding cycle as the tie rods 8 are relieved.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein.

What is claimed is:

1. A method of compression molding thermoplastic material with an injection molding machine having fixed and movable platens provided for respective attachment of half-molds and connected by tie rods, said method comprising the steps of:
   a) aligning locking elements on one of the fixed and movable platens with selected ones of receiving elements on the tie rods to thereby define a compression gap between the locking elements and the receiving elements;
   b) closing the mold,
   c) locking the platens by moving the locking elements into the selected ones of the receiving elements;
   d) starting injection of plasticized material into a cavity formed between the half-molds when the mold is closed;
   e) opening the mold as a result of pressure generated by injected plasticized material until the locking elements impact a confronting wall of the receiving elements to define a distance between the half-molds which distance corresponds to a width of the compression gap; and
   f) closing the mold through application of a clamping force, thereby compressing the plasticized material.

2. The method of claim 1, wherein the locking elements are clamps, and the receiving elements are grooves.

3. The method of claim 1, wherein step a) includes the step of moving the receiving elements in a position relative to the locking elements such that a distance is maintained between corresponding force-absorbing surfaces upon execution of step c), which distance corresponds essentially to the compression gap.

4. The method of claim 1, wherein the aligning step is executed as the tie rods are relieved.

5. The method of claim 4, wherein the tie rods apply a clamping force which is generated by hydraulic pressure pads which are controlled during relief of the tie rods such that the pressure pads are blocked in position when the compression gap position has been reached.

6. The method of claim 1, wherein the platens are connectable by four tie rods for application of a clamping force, wherein step a) is implemented using a distance measuring assembly provided on the tie rods.

7. The method of claim 1, wherein step b) includes a stop contact so that the cavity has a size which substantially corresponds to a final cavity size.

8. The method of claim 1, wherein step d) is initiated simultaneously with a release of the movable platen by removing a clamping force on the movable platen so as to allow execution of step e).

9. The method of claim 1, further comprising the step of continuing injection of plasticized material into the cavity during step f).

10. The method of claim 1, wherein step e) is assisted by moving cores.

11. The method of claim 10, wherein the cores are spring-loaded cores.

12. The method of claim 1, further comprising the step of maintaining the mold clamped after the step b) and before step d).

13. The method of claim 1, wherein the step e) includes the step of subjecting the movable platen to a defined counter-pressure.

14. The method of claim 1, wherein the plasticized material is a long fiber-reinforced thermoplastic material (LFT).

* * * * *